United States Patent
Liu et al.

(10) Patent No.: US 9,870,411 B2
(45) Date of Patent: Jan. 16, 2018

(54) MANAGING DATA INGESTION

(71) Applicant: Microsoft Corporation, Redmond, WA (US)

(72) Inventors: Zhen Liu, Tarrytown, NY (US); Bobby Chiu Chun Mak, Beijing (CN); Yet Luong Huynh, Beijing (CN); Chunxing Zhou, Beijing (CN); Li Zhao, Beijing (CN); Zhi-Peng Han, Beijing (CN); Gary Chia Chi Sun, Bellevue, WA (US); DaFeng Wang, Beijing (CN)

(73) Assignee: Microsoft Technology Licensing, LLC, Redmond, WA (US)

(*) Notice: Subject to any disclaimer, the term of this patent is extended or adjusted under 35 U.S.C. 154(b) by 190 days.

(21) Appl. No.: 14/557,347

(22) Filed: Dec. 1, 2014

(65) Prior Publication Data
US 2016/0019272 A1  Jan. 21, 2016

(30) Foreign Application Priority Data
Jul. 15, 2014 (WO) ............... PCT/CN2014/082215

(51) Int. Cl.
G06F 17/30 (2006.01)
(52) U.S. Cl.
CPC .............. *G06F 17/30563* (2013.01)
(58) Field of Classification Search
CPC ......... G06F 17/30563; G06F 17/30292; G06F 17/30569; G06F 17/30424;
(Continued)

(56) References Cited

U.S. PATENT DOCUMENTS 5,010,478 A 4/1991 Deran
7,912,869 B1 3/2011 Jas
(Continued)

FOREIGN PATENT DOCUMENTS

CN 101980213 A 2/2011
CN 102360370 A 2/2012
WO 2007005730 A2 1/2007

OTHER PUBLICATIONS

"International Search Report and Written Opinion Issued in PCT Patent Application No. PCT/CN2014/082215", dated Apr. 29, 2015, 13 pages.
(Continued)

*Primary Examiner* — Anh Ly
(74) *Attorney, Agent, or Firm* — Michael B. Dodd; Dodd Law Group

(57) ABSTRACT

The present invention extends to methods, systems, and computer program products for managing data ingestion. Aspects of the invention include a pluggable architecture channel service (e.g., a push/pull channel service) to ingest raw data. Aspects of the invention also include a pluggable architecture formatter to convert ingested raw data into a common format, such as, for example, key value pairs. Aspects of the invention also include an EAV storage with functionality allowing consumers to define multiple entities on (and spanning) ingested data sets. Accordingly, data can be ingested without data loss, without having to define extraction logic, and without having to define a storage schema.

20 Claims, 2 Drawing Sheets

(58) Field of Classification Search
CPC ........... G06F 17/30946; G06F 21/6218; G06F 17/30545; G06F 12/0246; G06F 3/0484; G06F 17/30575; G06F 17/30342; G06F 17/30528; G06F 17/30516; G06F 17/3053; G06F 17/30; H03M 13/05; H04L 67/1097; G06Q 10/00; G06N 3/08; G11B 220/2537

See application file for complete search history.

(56) References Cited

U.S. PATENT DOCUMENTS

| | | | | |
|---|---|---|---|---|
| 9,501,503 | B2* | 11/2016 | Mitra | G06F 17/30289 |
| 2002/0184401 | A1* | 12/2002 | Kadel, Jr. | G06F 8/76 |
| | | | | 719/315 |
| 2004/0249644 | A1 | 12/2004 | Schiefer et al. | |
| 2009/0089696 | A1* | 4/2009 | Miller | G06F 17/227 |
| | | | | 715/771 |
| 2010/0114895 | A1 | 5/2010 | Bhagwan et al. | |
| 2011/0040808 | A1* | 2/2011 | Joy | G06F 8/20 |
| | | | | 707/812 |
| 2011/0179020 | A1* | 7/2011 | Ozzie | G06F 17/3089 |
| | | | | 707/723 |
| 2013/0124545 | A1* | 5/2013 | Holmberg | G06F 17/30244 |
| | | | | 707/756 |
| 2013/0227573 | A1* | 8/2013 | Morsi | G06F 9/5083 |
| | | | | 718/100 |
| 2013/0325881 | A1 | 12/2013 | Deshpande et al. | |
| 2014/0013070 | A1* | 1/2014 | Toronyi | G11C 11/402 |
| | | | | 711/167 |
| 2014/0279838 | A1* | 9/2014 | Tsirogiannis | G06F 17/30292 |
| | | | | 707/603 |
| 2014/0280085 | A1* | 9/2014 | Westhafer | G06F 17/30241 |
| | | | | 707/723 |
| 2014/0337358 | A1* | 11/2014 | Mitra | G06F 17/30289 |
| | | | | 707/748 |
| 2015/0081832 | A1* | 3/2015 | Handa | G06F 15/167 |
| | | | | 709/213 |
| 2015/0120745 | A1* | 4/2015 | James | G06F 17/30306 |
| | | | | 707/741 |
| 2015/0347486 | A1* | 12/2015 | Julia | G06F 17/30342 |
| | | | | 707/736 |
| 2016/0021198 | A1* | 1/2016 | Liu | H04L 43/0876 |
| | | | | 709/223 |

OTHER PUBLICATIONS

"Supplementary European Search Report Issued in European Patent Application No. 14897491.8", dated Oct. 25, 2017, 11 Pages.

* cited by examiner

MANAGING DATA INGESTION

CROSS-REFERENCE TO RELATED APPLICATIONS

This application claims priority to PCT Application No. CN2014/082215, filed Jul. 15, 2014, and entitled "MANAGING DATA INGESTION"

BACKGROUND

1. Background and Relevant Art

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. More recently, computer systems have been coupled to one another and to other electronic devices to form both wired and wireless computer networks over which the computer systems and other electronic devices can transfer electronic data. Accordingly, the performance of many computing tasks is distributed across a number of different computer systems and/or a number of different computing environments.

Data provided to computer systems can come from any number of different sources, such as, for example, user input, files, databases, applications, sensors, etc. In some environments, computer systems receive (potentially large volumes of) data from a variety of different domains and/or verticals. Data can also be received in a variety of different formats.

Data provided to computer systems is often accessed an extract, transform, and load (ETL) technique. ETL refers to a process that extracts data from data sources, transforms the data to fit operational needs, and loads the data into an end target. ETL systems can be used to integrate data from multiple varied sources, such as, for example, from different vendors, hosted on different computer systems, etc.

ETL is essentially an extract and then store process. Prior to implementing an ETL solution, a user defines what (e.g., subset of) data is to be extracted from a data source and a schema of how the extracted data is to be stored. During the ETL process, the defined (e.g., subset of) data is extracted, transformed to the form of the schema (i.e., schema is used on write), and loaded into a data store. To access different data from the data source, the user has to redefine what data is to be extracted. To change how data is stored, the user has to define a new schema.

ETL is beneficially because it allows a user to access a desired portion of data in a desired format. However, ETL can be cumbersome as data needs evolve. Each change to the extracted data and/or the data storage results in the ETL process having to be restarted.

BRIEF SUMMARY

The present invention extends to methods, systems, and computer program products for managing data ingestion. Aspects of the invention include ingesting data in one (e.g., a raw) data format and formatting the ingested data into common format for storage. Data is ingested and formatted without foreknowledge of extraction logic or storage schema.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific implementations thereof which are illustrated in the appended drawings. Understanding that these drawings depict only some implementations of the invention and are not therefore to be considered to be limiting of its scope, the invention will be described and explained with additional specificity and detail through the use of the accompanying drawings in which.

DETAILED DESCRIPTION

Figure 1:
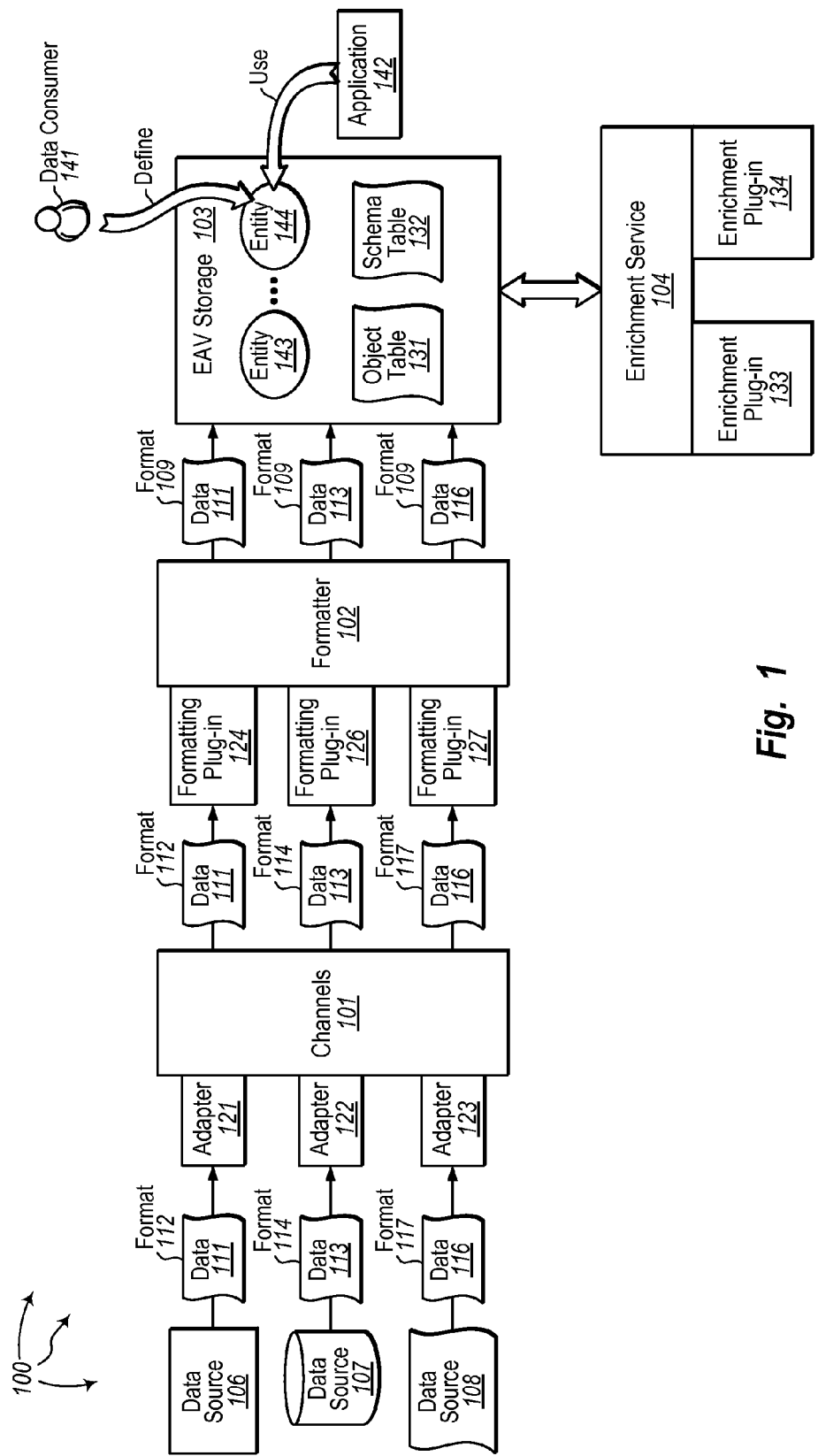
FIG. 1 illustrates an example computer architecture that facilitates managing data ingestion.

The present invention extends to methods, systems, and computer program products for managing data ingestion. Aspects of the invention include ingesting data in one (e.g., a raw) data format and formatting the ingested data into common format for storage. Data is ingested and formatted without foreknowledge of extraction logic or storage schema.

Implementations of the present invention may comprise or utilize a special purpose or general-purpose computer including computer hardware, such as, for example, one or more processors and system memory, as discussed in greater detail below. Implementations within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the invention can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that computer storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

The invention can also be implemented in cloud computing environments. In this description and the following claims, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud computing model can be composed of various characteristics such as, for example, on-demand self-service, broad network access, resource pooling, rapid elasticity, measured service, and so forth. A cloud computing model can also expose various service models, such as, for example, Software as a Service ("SaaS"), Platform as a Service ("PaaS"), and Infrastructure as a Service ("IaaS"). A cloud computing model can also be deployed using different deployment models such as private cloud, community cloud, public cloud, hybrid cloud, and so forth. In this description and in the claims, a "cloud computing environment" is an environment in which cloud computing is employed.

FIG. 1 illustrates an example computer architecture 100 that facilitates managing data ingestion. Referring to FIG. 1, computer architecture 100 includes channels 101, formatter 102, EAV storage 103, enrichment service 104, data sources 106, 107, and 108, data consumer 141, and application 142. Each of channels 101, formatter 102, EAV storage 103, enrichment service 104, data sources 106, 107, and 108, data consumer 141, and application 142 can be connected to one another over (or be part of) a network, such as, for example, a Local Area Network ("LAN"), a Wide Area Network ("WAN"), and even the Internet. Accordingly, each of channels 101, formatter 102, EAV storage 103, enrichment service 104, data sources 106, 107, and 108, data consumer 141, and application 142, as well as any other connected computer systems and their components, can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc. or using other non-datagram protocols) over the network.

A variety of different data sources can provide raw data for ingestions. As depicted, data sources 106, 107, 108, etc., can provide raw data to channels 101 for ingestion. A data source can be and/or include of a variety of different components, such as, for example, a database, a file, a web service, an application, etc.

Each data source can provide raw data in a specified raw data format (e.g., eXstensible Markup Language (XML), Comma (or Character) Separated Values (CSV), Rich Site Summary (RSS), HyperText Markup Language (HTML), Sensor data formats, Database data formats, etc.). For example, data sources 106, 107, 108 can provide raw data in formats 112, 114, and 117 respectively. Raw data formats can differ between data sources. For example, each of formats 112, 114, and 117 can differ from one another. Even when raw data formats of data sources are the similar (or the same), raw data can be provided using different access mechanisms (e.g., protocols and/or security contexts). Raw data can be provided using bulk based, message based, or event based mechanisms.

Channels 101 can include push/pull channels defining how a data source is to be accessed. A channel can define an access mechanism for data source access. An access mechanism can include a protocol, such as, for example, HyperText Transfer Protocol (HTTP), File Transfer Protocol (FTP), etc.) and/or a security context for data source access. Different channels can utilize different protocols and/or security contexts matched to a corresponding data source (or data sources). Each adapter can be configured for a (e.g., different) combination of protocol and security context. As depicted, channels 101 utilize adapters 121, 122, 123, etc. Each of adapters 121, 122, 123, etc. can be configured to ingest raw data that is transferred using a specified combination of protocol and security context (or other settings). As such, adapters can be added for new protocols and/or security contexts as further technologies are developed.

Formatter 102 is configured to format raw data into a common format for storage in EAV (entity-attribute-value) storage 103. Formatter 102 can utilize different plug-ins to format different raw data formats into the common format. Each formatting plug-in can be configured to understand how to digest raw data in specified raw data format and format the raw data into the common format.

As depicted, formatter 102 utilizes formatting plug-ins 124, 126, and 127. Each of formatting plug-ins 124, 126, and 127 can be configured to format data of a specified raw data format, such as, XML, CSV, etc., into the common format. Formatter 102 can store data that has been formatted into the common format in EAV storage 103. In one aspect, the common format includes (or is) key-value pairs. Formatter 102 can store key-value pairs in EAV sets in EAV storage 103.

Enrichment service 104 can enrich data stored in EAV storage 104. Enrichment service can utilize different enrichment plug-ins to connect to different external data enrichment services. Each enrichment plug-in can be configured to understand enrichment data from a specified external data enrichment service. In one aspect, enrichment service 104 is also configured to format enrichment data into the command format for storage in EAV storage 103. Data enrichment can include data augmentation to fill in missing data in EAV storage 103. Data enrichment can also include supplementing data (e.g., an EAV set) with other data, such as, geographic data, demographic data, behavioral data, census data, etc.

As depicted, enrichment service utilizes enrichment plug-ins 133 and 134. Each of enrichment plug-ins 133 and 134 can be configured to access enrichment data for a specified external data enrichment service. Enrichment service 104 can format accessed enrichment data into the common format, for example, key-value pairs, for storage along with ingested raw data in EAV storage 103.

Data consumers can define an interest in entities, such as, for example, entities, 143 and 144, by picking attributes from data stored in EAV storage 103. In one aspect, data consumers select attributes from EAV sets stored in EAV storage 103. Applications can then use the defined entities for data retrieval. For example, application 142 can use entity 144 to retrieve data from EAV storage 103.

Object table 131 and schema table 132 can be used to store objects and schemas respectively associated with defined entities.

Figure 2:
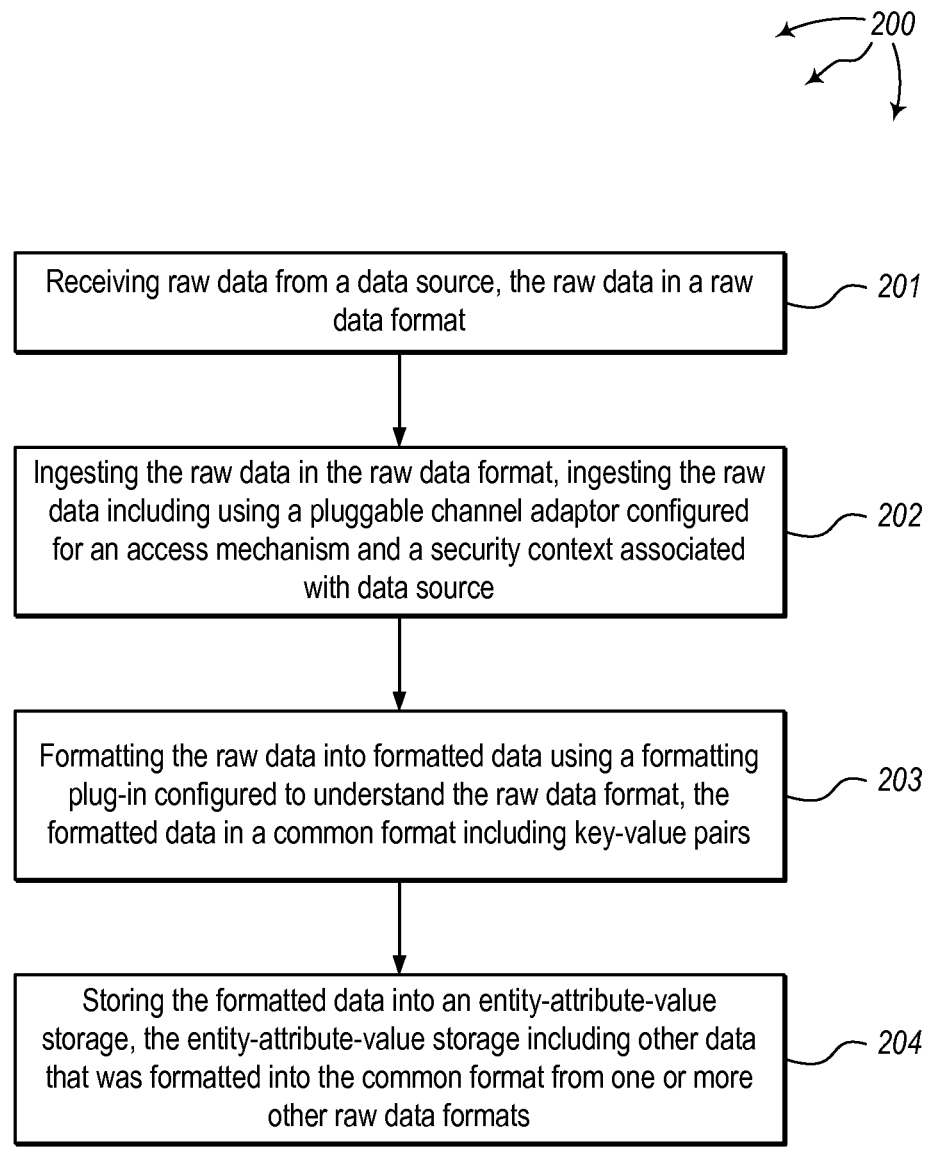
FIG. 2 illustrates a flow chart of an example method for managing data ingestion.

FIG. 2 illustrates a flow chart of an example method 200 for managing data ingestion. Method 200 will be described with respect to the components and data of computer architecture 100.

Method 200 includes receiving raw data from a data source, the raw data in a raw data format (201). For example, adapter 121 can receive data 111 from data source 106. Data 111 can be raw data in format 112. Method 200 includes ingesting the raw data in the raw data format, ingesting the raw data including using a pluggable channel adaptor configured for a protocol and a security context associated with data source (202). For example, channels 101 and adapter 121 can interoperate to ingest data 111. Adapter 121 can configured for a protocol and security context associated with data source 106.

Channels 101 can send data 111 (in format 112) to formatting plug-in 124. Formatting plug-in 124 can be configured to understand how to digest data in format 112.

Method 200 includes formatting the raw data into formatted data using a formatting plug-in configured to understand the raw data format, the formatted data in a common format including key-value pairs (203). For example, formatter 102 and formatting plug-in 124 can interoperate to format data 111 into format 109. Format 109 can be a common format used by EAV storage 103 and can include key-value pairs. Method 200 includes storing the formatted data into an entity-attribute-value storage, the entity-attribute-value storage including other data that was formatted into the common format from one or more other raw data formats (204). For example, formatter 102 can store data 111 (in format 109) in EAV storage 103. Data 111 can be stored along with other data that was formatted into format 109 from one or more other raw data formats (e.g., formats 114, 117, etc.). Data 111 can be stored as an EAV set.

Data from other data sources can be similarly ingested, formatted, and stored. For example, adapter 122 can receive data 113 from data source 107. Data 113 can be raw data in format 114. Channels 101 and adapter 122 can interoperate to ingest data 113. Adapter 123 can configured for a protocol and security context associated with data source 107. Channels 101 can send data 113 (in format 114) to formatting plug-in 126. Formatting plug-in 126 can be configured to understand how to digest data in format 114.

Formatter 102 and plug-in 126 can interoperate to format data 114 into format 109. Formatter 102 can store data 113 (in format 109) in EAV storage 103. Data 113 can be stored along with data 111 and other data that was formatted into format 109 from one or more other raw data formats (e.g., format 117, etc.). Data 113 can be stored as an EAV set.

Similarly, adapter 123 can receive data 116 from data source 108. Data 116 can be raw data in format 117. Channels 101 and adapter 123 can interoperate to ingest data 117. Adapter 123 can configured for a protocol and security context associated with data source 108. Channels 101 can send data 116 (in format 117) to formatting plug-in 127. Formatting plug-in 127 can be configured to understand how to digest data in format 117.

Formatter 102 and formatting plug-in 127 can interoperate to format data 116 into format 109. Formatter 102 can store data 116 (in format 109) in EAV storage 103. Data 116 can be stored along with data 111, data 113, and other data that was formatted into format 109 from one or more other raw data formats. Data 116 can be stored as an EAV set.

Data from a plurality of different data sources can be ingested, formatted, and stored serially or in parallel. Ingestion, formatting, and storage of data from different sources can occur at the same time or at different times. Data ingestion can be an ongoing process as new data is available at data sources.

As described, data consumers can define an interest in entities by selected attributes from EAV sets. For example, data consumer 141 can select attributes from EAV sets stored in EAV storage 103 to define an interest in entity 144. Attributes can be selected from a variety of different EAV sets, including EAV sets based on data from different data sources. For example, data consumer 141 can select attributes from a plurality of EAV sets based on data 111, 113, and 116 to define entity 144.

Associated with defining an entity, consumer 141 can define one or more objects and/or one or more schemas to apply to data at read time. Defined objects and schemas can be stored in object table 131 and schema table 132 respectively.

Application 142 can then utilize entity 144 to retrieve data from EAV storage 103. For example, application 142 can retrieve (read) data associated with attributes selected by consumer 141. Data can be delivered from EAV storage 103 to application 142 in accordance with objects and schemas defined for entity 144.

Data consumer 141 (or some other data consumer) can also select (e.g., different) attributes to from EAV sets to define entity 143. Objects and schemas associated with entity 143 can also be defined and stored in appropriate tables.

As such, aspects of the invention include a pluggable architecture channel service (e.g., a push/pull channel service) to ingest raw data. Aspects of the invention also include a pluggable architecture formatter to convert ingested raw data into a common format, such as, for example, key value pairs. Aspects of the invention also include an EAV storage with functionality allowing consumers to define multiple entities on (and spanning) ingested data sets.

Accordingly, data can be ingested without data loss, without having to define extraction logic, and without having to define a storage schema. Entities are defined by a data consumer and apply during read time (rather than pre-defined data entities applied during write time).

Thus, an entity can load any data they aware of and also remain flexible to load other data learned of in the future. The entity can also adapt to evolving data needs since entities can be defined and redefined to access data from EAV storage without having to load more data from data sources.

The present invention may be implemented in other specific forms without departing from its spirit or essential characteristics. The described implementations are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. At a computer system, a method for supplementing a data consumer defined data entity with additional data from a new data source, the data consumer defined data entity spanning one or more ingested data sets from one or more data sources, the method comprising:
   receiving a new data set from the new data source, the new data set in a raw data format used by the new data source, the new data source in addition to the one or more data sources;
   responsive to receiving the new data set from the new data source:
      ingesting the new data set in the raw data format, ingesting the new-data set including utilizing a combined access mechanism and security context matched to the new data source;
      converting the new data set into a common format using a formatting plug-in configured to understand the raw data format; and
      storing new data set into storage, the storage including the one or more ingested data sets, the one or more ingested data sets having been previously formatted into the common format from one or more other raw data formats used by the one or more data sources, the one or more data sets previously ingested from the one or more data sources using combined access mechanisms and security contexts matched to each of the one or more data sources; and
   applying a schema to stored data in the common format, the stored data from the new ingested data set and the one or more ingested data sets, the stored data associated with data consumer selected attributes included in the data consumer defined data entity.

2. The method of claim 1, further comprising:
   receiving a further data set from a further data source, the further data set in a further raw data format used by the further data source, the further raw data format differing from the raw data format;
   ingesting the further data set in the second raw data format, ingesting the second raw data including using a further combined access mechanism and a security context matched to the further data source the further combined access mechanism and security context differing from the combined access mechanism and security context;
   converting the further data set into the common format using a further formatting plug-in configured to understand the further raw data format; and
   supplementing the stored data by storing the further data set into the storage along with the new data set.

3. The method of claim 2, wherein the first raw data format is eXstensbile Markup Language (XML) and the second raw data format is Character Separated Value (CSV).

4. The method of claim 1, wherein storing the new data set into storage comprises storing the new data set into an entity-attribute-value data set. plurality of other entity attribute value data sets.

5. The method of claim 4, further comprising enriching the entity-attribute-value data set with additional data from a pluggable enrichment service.

6. The method of claim 1, further comprising:
   receiving the consumer selection of attributes indicating that the consumer defined data entity is to span a plurality of data sets.

7. The method of claim 6, further comprising formulating the schema, the schema defining a data layout for returning data associated with the data consumer defined entity.

8. The method of claim 7, further comprising:
   receiving an application request for data associated with the data consumer defined data entity; and
   returning the requested data from the storage to the application in the defined data layout in accordance with the schema.

9. A computer program product for use at a computer system, the computer program product for implementing a method for supplementing a data consumer defined data entity with additional data from a new data source, the data consumer defined data entity spanning one or more ingested data sets from one or more data sources, the computer program product comprising one or more computer storage media having stored thereon computer-executable instructions that, when executed at a processor, cause the computer system to perform the method, including the following:
   receive a new data set from the new data source, the new data set in a raw data format used by the new data source, the new data source in addition to the one or more data sources;
   responsive to receiving the new data set from the new data source:

ingest the new data set in the raw data format, ingesting the new data set including utilizing a combined access mechanism and security context matched to the new data source;

convert the new data set into a common format using a formatting plug-in configured to understand the raw data formate; and store new data set into storage, the storage including the one or more ingested data sets, the one or more ingested data sets having been previously formatted into the common format from one or more other raw data formats used by the one or more data sources, the one or more data sets previously ingested from the one or more data sources using combined access mechanisms and security contexts matched to each of the one or more data sources; and apply a schema to stored data in the common format, the stored data from the new ingested data set and the one or more ingested data sets, the stored data associated with data consumer selected attributes included in the data consumer defined data entity.

10. The computer program product of claim 9, further comprising computer-executable instructions that, when executed, cause the computer system to:

receive a further data set from a further data source, the further data set in a further raw data format used by the further data source, the further raw data format differing from the raw data format;

ingest the further data set in the second raw data format, ingesting the second raw data including using a further combined access mechanism and a security context matched to the further data source the further combined access mechanism and security context differing from the combined access mechanism and security context;

convert the further data set into the common format using a further formatting plug-in configured to understand the further raw data format; and supplement the stored data by storing the further data set into the storage along with the new data set.

11. The computer program product of claim 9, wherein computer-executable instructions that, when executed, cause the computer system to store the data set into storage comprise computer-executable instructions that, when executed, cause the computer system to store the data set into an entity-attribute-value data set.

12. The computer program product of claim 11, further comprising computer-executable instructions that, when executed, cause the computer system to enrich the entity-attribute-value data set with additional data from a pluggable enrichment service.

13. The computer program product of claim 11, further comprising computer-executable instructions that, when executed, cause the computer system to:

receive the consumer selection of attributes indicating that the consumer defined data entity is to span a plurality of data sets.

14. The computer program product of claim 13, further computer-executable instructions that, when executed, cause the computer system to formulate the schema, the schema defining a data layout for returning data associated with the data consumer defined entity.

15. The computer program product of claim 14, further comprising computer-executable instructions that, when executed, cause the computer system to:

receive an application request for data associated with the data consumer defined data entity; and return the requested data from the storage to the application in the defined data layout in accordance with the schema.

16. A computer system, the computer system comprising:
one or more processors;
system memory coupled to the one or more hardware processors, the system memory storing instructions that are executable by the one or more hardware processors;
the one or more hardware processors executing the instructions stored in the system memory to supplementing a data consumer defined data entity with additional data from a new data source, the data consumer defined data entity spanning one or more ingested data sets from one or more data sources, including the following:

receive a new data set from the new data source, the new data set in a raw data format used by the new data source, the new data source in addition to the one or more data sources;

responsive to receiving the new data set from the new data source:

ingest the new data set in the raw data format, ingesting the new-data set including utilizing a combined access mechanism and security context matched to the new data source;

convert the new data set into a common format using a formatting plug-in configured to understand the raw data format; and store new data set into storage, the storage including the one or more ingested data sets, the one or more ingested data sets having been previously formatted into the common format from one or more other raw data formats used by the one or more data sources, the one or more data sets previously ingested from the one or more data sources using combined access mechanisms and security contexts matched to each of the one or more data sources; and apply a schema to stored data in the common format, the stored data from the new ingested data set and the one or more ingested data sets, the stored data associated with data consumer selected attributes included in the data consumer defined data entity.

17. The computer system or claim 16, further configured comprising the one or more hardware processors executing the instructions stored in the system memory to:

receive a further data set from a further data source, the further data set in a further raw data format used by the further data source, the further raw data format differing from the raw data format;

ingest the further data set in the second raw data format, ingesting the second raw data including using a further combined access mechanism and a security context matched to the further data source the further combined access mechanism and security context differing from the combined access mechanism and security context;

convert the further data set into the common format using a further formatting plug-in configured to understand the further raw data format; and supplement the stored data by storing the further data set into the storage along with the new data set.

18. The computer system of claim 16, wherein the one or more hardware processors executing the instructions stored in the system memory to store the data set into storage comprises the one or more the one or more hardware processors executing the instructions stored in the system memory to store the data set into an entity-attribute-value (EAV) data set.

19. The computer system of claim 18, further comprising the one or more hardware processors executing the instructions stored in the system memory to:
   receive the consumer selection of attributes indicating that the consumer defined data entity is to span a plurality of data sets.

20. The computer system of claim 18, further comprising the one or more hardware processors executing the instructions stored in the system memory to:
   receive an application request for data associated with the data consumer defined data entity; and
   return the requested data from the storage to the application in the defined data layout in accordance with the schema.

\* \* \* \* \*